United States Patent

[11] 3,601,966

| [72] | Inventor | Byron Joseph Kerry |
| | | 6561 Calhoun, Dearborn, Mich. 48126 |
| [21] | Appl. No. | 884,642 |
| [22] | Filed | Dec. 12, 1969 |
| [45] | Patented | Aug. 31, 1971 |

[54] COMBINATION RAKE AND PICKUP DEVICE
3 Claims, 7 Drawing Figs.

[52] U.S. Cl....................................................... 56/400.12, 294/19 R
[51] Int. Cl........................................................ A01d 7/10
[50] Field of Search............................................ 56/400.12, 400.13, 400.16, 400.17; 294/104, 105, 19 R, 19 A

[56] References Cited
UNITED STATES PATENTS
| 2,504,943 | 4/1950 | Zifferer | 56/400.12 |
| 1,715,613 | 6/1929 | McFadden | 56/400.12 |
| 2,746,234 | 5/1956 | Utley | 56/400.12 |
| 3,105,348 | 10/1963 | Vosbikian et al. | 56/400.12 |
| 3,264,809 | 8/1966 | Jackson | 56/400.12 |

Primary Examiner—Russell R. Kinsey
Attorney—Adolph G. Martin

ABSTRACT: A combination rake and pickup device consisting of a pair of oppositely disposed conventional broom rake heads, one of which has attached thereto an elongated handle. The other rake head is movably supported by the elongated handle, and may be selectively shifted to either an inoperative retracted position, or an advanced position where it enters into a holding relationship with the first mentioned rake head.

PATENTED AUG 31 1971 3,601,966
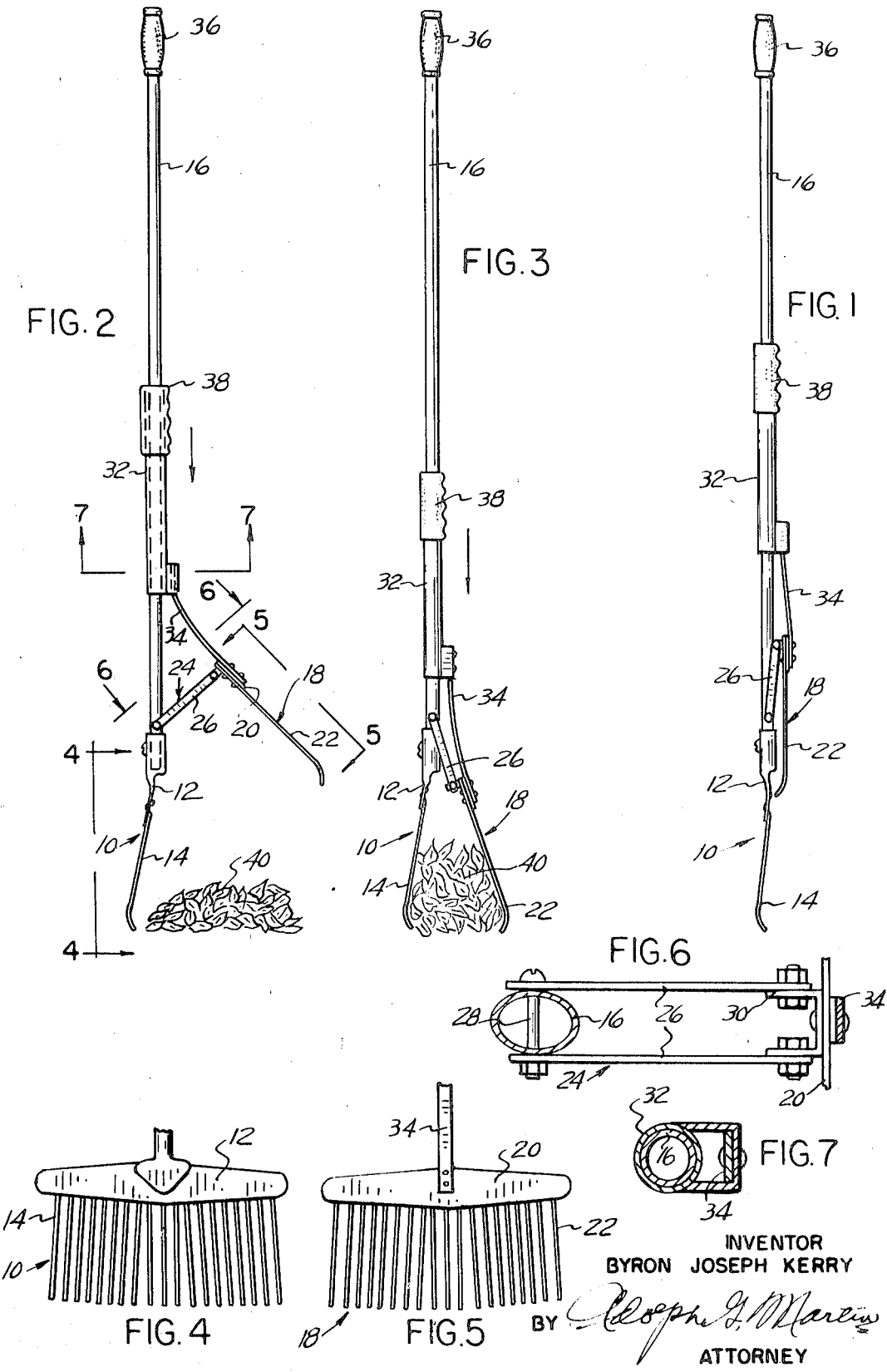
INVENTOR
BYRON JOSEPH KERRY
BY Adolph G. Martin
ATTORNEY

COMBINATION RAKE AND PICKUP DEVICE

BACKGROUND OF THE INVENTION

This invention relates to rakes generally, but more particularly to a broom rake of the type commonly used in removing leaves, grass cuttings and other debris from lawns. Conventional broom rakes are customarily used to sweep the leaves and cuttings into piles, which are then picked up manually, and placed either in disposable bags or containers for removal to an area where they can be dumped or burned. This latter operation constitutes an arduous and sometimes impossible chore for people who are unable to withstand the physical exertions involved. Therefore, elderly and handicapped homeowners are not always able to personally maintain their lawns by the use of conventional tools and equipment.

SUMMARY OF THE INVENTION

This invention consists of two oppositely disposed rake heads 10 and 18, one of which has thereon an elongated handle 16. A link 24, pivotally connected between the second rake head 18 and the elongated handle 16, provides a retracted and an advanced position for the head 18. A slidable operator sleeve 32 on the elongated handle 16, is connected to the second rake head 18 by a resilient member 34 which yieldably holds the head 18 in either the retracted or advanced position to which it is selectively moved by means of the slidable operator sleeve 32.

BRIEF DESCRIPTION OF THE DRAWING

FIG. 1 is a side elevation view of the device comprising the applicant's invention, showing the second rake head 18 in a retracted inoperative position.

FIG. 2 is a side elevation view of the device, showing the second rake head 18 in an intermediate position relative to the first rake head 10.

FIG. 3 is a side elevation view of the device, showing the second rake head 18 in an advanced position and in a holding relationship with the first rake head 10.

FIG. 4 is an elevation view, taken substantially on plane 4—4 in FIG. 2, showing the cross member 12 and the flexible fingers 14 on the first rake head 10.

FIG. 5 is an elevation view, taken substantially on plane 5—5 in FIG. 2, showing the second rake head 18 and the attached elongated spring 34.

FIG. 6 is an enlarged section view, taken substantially on plane 6—6 in FIG. 2, showing structural details of the link 24 connecting the second rake head 18 to the slidable operator sleeve 32.

FIG. 7 is a section view, taken substantially on plane 7—7 in FIG. 2, showing attachment of the elongated spring 34 to the slidable operator sleeve 32.

CONSTRUCTION

For a more detailed description of the invention, reference is made to the drawing in which numeral 10 designates a first rake head comprising a cross member 12 having attached thereto a series of flexible fingers 14, and an elongated handle 16. A second rake head 18, oppositely disposed to the first rake head 10, likewise has a cross member 20 and spaced flexible fingers 22. A pivoted link 24, connects the second rake head 18 to the elongated handle 16.

The pivoted link 24 consists of a pair of spaced bars 26 connected at one end to a pintle 28 on the elongated handle 16, and at the other end to a U-shaped bracket 30 mounted on the cross member 20. A slidable operator sleeve 32, on the elongated handle 16, is attached to the cross member 20 of the second rake head 18 by a flat elongated spring 34. A pair of hand grips 36 and 38 are mounted respectively on the upper ends of the elongated handle 16 and the operator sleeve 32.

The preceding discussion completes a description of the structural details relating to the applicant's invention herein disclosed. However to facilitate a more thorough and comprehensive understanding of the subject matter, a discussion is immediately hereinafter directed to the manner in which the device operates to accomplish its intended function.

OPERATION

In use, the applicant's device is grasped with one hand on each of the grips 36 and 38, and manipulated to retract the slidable operator sleeve 32 to the position shown in FIG. 1. In this position, the device can be used so that rake head 10 serves in the conventional manner to collect grass cuttings, leaves, and other debris into a pile 40. When a pile of sufficient size has been collected, the device is positioned so that the first rake head 10 is on the front side of the pile 40, as shown in FIG. 2.

The device is then manipulated, by shifting the slidable operator sleeve 32 to an advanced position, as shown in FIG. 3, wherein the second rake head 18 enters into a holding relationship with the first rake head 10. The leaves 40 are then trapped between the two rake heads 10 and 18, and may be conveniently lifted and deposited into a suitable receptacle, not here shown, for disposition. After the pile of leaves 40 has been removed, the device is again returned to the position shown in FIG. 1, and the raking operation continued as previously described.

Based upon the foregoing discussion, the applicant is of the opinion that his invention has fulfilled a longfelt need in the field of rakes and pickup devices, and that he has accordingly made a valuable contribution to the related art. However, while the invention was described with reference to the structural details of only a single embodiment, it will be appreciated by those familiar with the art that the principles involved are susceptible of numerous other practical adaptations.

I therefore claim as new, and desire to secure by Letters Patent:

1. A combination rake and pickup device comprising a first rake head, an elongated handle on the first rake head, a second rake head oppositely disposed to the first rake head, a link pivotally connected at one end to said handle and at the other end to said second rake head, said link providing both a retracted position and an advanced position for the second rake head, said second rake head being inoperative when in its retracted position, and adapted to enter into a holding relationship with the first rake head when in its advanced position, a slidable operator sleeve on the elongated handle, and a resilient member connecting the operator sleeve to the second rake head for yieldably holding the head in either the retracted or advanced position to which it is selectively moved by the slidable operator sleeve.

2. The combination rake and pickup device of claim 1 in which the link comprises a pintle on the elongated handle, a pair of spaced bars pivotally supported at one end on the pintle, and a U-shaped bracket on the second rake head pivotally connected to the other end of each spaced bar.

3. The combination rake and pickup device of claim 2 in which the resilient member comprises an elongated spring having a rectangular cross section.